US009829971B2

(12) United States Patent
San Agustin Lopez et al.

(10) Patent No.: US 9,829,971 B2
(45) Date of Patent: Nov. 28, 2017

(54) SYSTEMS AND METHODS OF EYE TRACKING CONTROL

(71) Applicant: Facebook, Inc., Menlo Park, CA (US)

(72) Inventors: Javier San Agustin Lopez, Copenhagen S (DK); Sebastian Sztuk, Copenhagen N. (DK); Martin Henrik Tall, Frederiksberg C. (DK)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/159,168

(22) Filed: Jan. 20, 2014

(65) Prior Publication Data

US 2014/0204029 A1 Jul. 24, 2014

Related U.S. Application Data

(60) Provisional application No. 61/754,888, filed on Jan. 21, 2013.

(51) Int. Cl.
*G06F 3/01* (2006.01)
*G06F 3/0488* (2013.01)
*G06F 3/0482* (2013.01)

(52) U.S. Cl.
CPC ............ *G06F 3/013* (2013.01); *G06F 3/0482* (2013.01); *G06F 3/0488* (2013.01)

(58) Field of Classification Search
CPC ........ G06F 1/32; G06F 13/102; G06F 3/0202; G06F 1/1684; G06F 3/01
See application file for complete search history.

(56) References Cited

U.S. PATENT DOCUMENTS

2002/0067334 A1* 6/2002 Hinckley ............... A63F 13/06
345/156
2013/0135196 A1* 5/2013 Park ......................... G06F 3/01
345/156

FOREIGN PATENT DOCUMENTS

EP  2450872 A1 * 5/2012 ............... G06F 3/34

* cited by examiner

*Primary Examiner* — Tony N Ngo
(74) *Attorney, Agent, or Firm* — Fenwick & West LLP

(57) ABSTRACT

Methods and systems to facilitate eye tracking control are provided. A user input is received at a computing device. Point of regard information associated with a user of the computing device is determined while the user input is being received. The point of regard information indicates a location on a display of the computing device at which the user is looking. An operation associated with a display object identified based on the point of regard information is performed when receipt of the user input is determined to have terminated.

14 Claims, 16 Drawing Sheets

SYSTEMS AND METHODS OF EYE TRACKING CONTROL

CROSS-REFERENCE TO RELATED APPLICATIONS

This application claims a priority benefit under 35 U.S.C. §119(e) of U.S. Provisional Application No. 61/754,888, filed Jan. 21, 2013, entitled "Systems and Methods of Eye Tracking Control," which is incorporated herein by reference in its entirety.

TECHNICAL FIELD

The present disclosure generally relates to eye tracking and, more specifically, to systems and methods of facilitating eye tracking control.

BRIEF DESCRIPTION OF THE DRAWINGS

Some embodiments are illustrated by way of example and not of limitation in the figures of the accompanying drawings.

DETAILED DESCRIPTION

Figure 1:
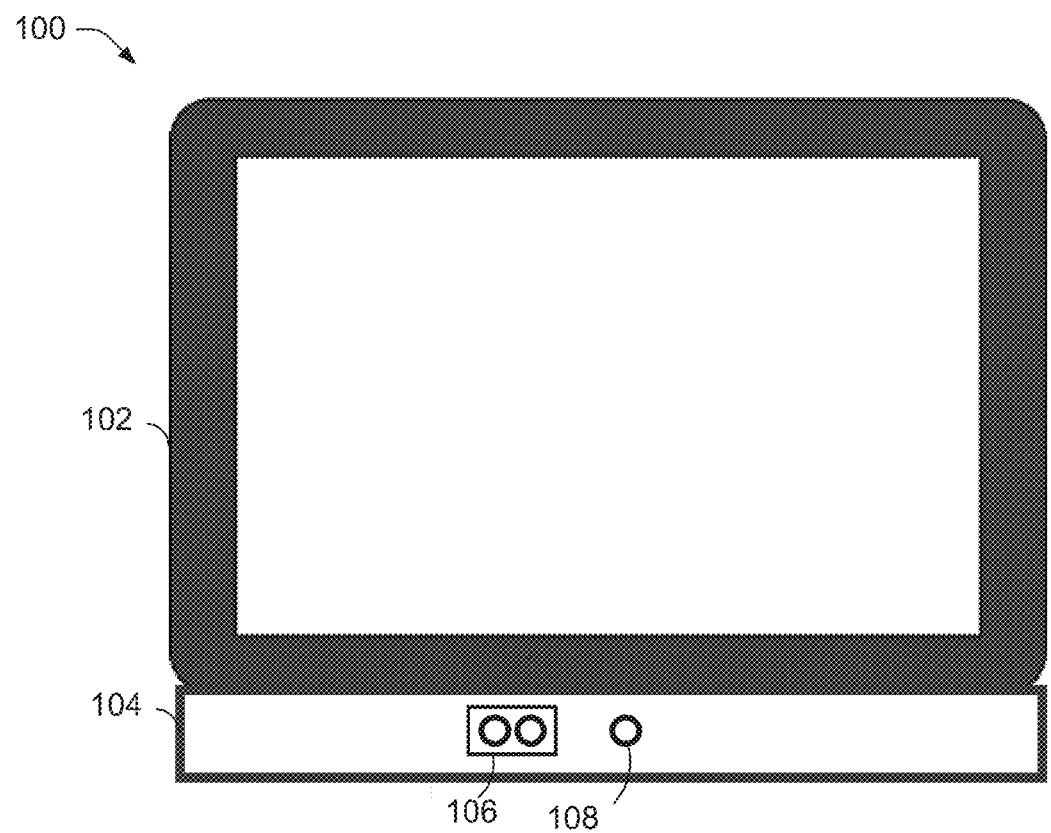
FIG. 1 is a device diagram of an example computing device coupled to a docking device capable of facilitating eye tracking control, according to some embodiments.

Example systems and methods to facilitate eye tracking control are described. In the following description, for purposes of explanation, numerous specific details are set forth in order to provide a thorough understanding of example embodiments. It will be evident, however, to one skilled in the art that the present technology may be practiced without these specific details.

A user of a computing device may interact with and control objects and applications displayed on the computing device through the user's eye movement. An image of the user's eyes and/or face, captured by a front-facing camera on or coupled to the computing device, may be analyzed using computer-vision algorithms, such as, for example, eye tracking algorithms and gaze detection algorithms. For example, the captured images may be processed to extract information relating to features of the user's eyes and/or face. The computing device may then use the extracted information to determine the location of the user's eyes and estimate the location on the display at which the user is looking. For example, the computing device may be able to estimate at which icon on the display the user is looking. The estimation of where the user is looking may be used to direct one or more objects, applications, and the like to perform a particular operation. For example, the user may direct and control the movement of an object on the screen depending on where the user is looking on the display of the computing device, including controlling scrolling functions, the movement of objects in a virtual game, and the like.

In some embodiments, the user may select and interact with an object being displayed on the computing device using the eye tracking features. The object of interest (e.g., the display object being gazed upon by the user) may be manipulated by the user through input modalities and/or buttons, such as a touch sensor, physical buttons (e.g., a push button), a mouse, a keyboard, biometric signals (e.g., electroencephalography (EEG), electromyography (EMG), electrooculography (EOG)), and the like. For example, a grid of pictures may be displayed on the computing device. When the user submits an input through a particular input modality (e.g., the user performs a figure gesture or touch input), the input applies to the picture at which the user is looking.

In some embodiments, the user may signal the intention to use the user's eyes as an input by tapping on the display of the computing device or on a physical button and holding, which may initiate an activation signal. The user may look at the desired display object and confirm the selection of the object by releasing the tap or the physical button.

In some embodiments, the activation signal may start an eye control mode on the computing device, which may last until the activation signal terminates (e.g., when the tap or button is released). The tap or input may occur in any manner, such as on a specific area of the display of the computing device, on an external touch pad, on a touchpad on the back of the computing device, using a button (e.g., on the device, on a mouse, a key, a joystick, a trigger), a biometric signal, and the like.

During the time the activation signal is active, the computing device may calculate the point of regard of the user. When the activation signal is terminated by the user, the computing device may activate the object gazed upon at the time when the activation signal was terminated.

FIG. 1 is a device diagram 100 of an example computing device 102 coupled to a docking device 104 capable of facilitating eye tracking control. The computing device 102 may be any type of computing device, including, but not limited to, a smart phone, a personal digital assistant (PDA), a mobile phone, a computing tablet, an electronic reader, a television, a laptop, a desktop computer, a display, and the like. During eye tracking control, the computing device 102 may be used by the user by holding the computing device 102 with one hand, both hands, or while the computing device 102 is on a stand or resting on a surface.

A docking device 104 may be coupled to the computing device 102 in any manner, such as through a universal serial bus (USB) port on the computing device 102, micro USB port on the computing device 102, and the like. While the docking device 104 of FIG. 1 is depicted at the bottom of the computing device 102, one of ordinary skill in the art will appreciate that the docking device 104 may be located at any suitable location relative to the computing device 102. The docking device 104 may include a camera module 108 and one or more light-emitting diodes (LEDs) 106. For explanatory purposes, LEDs 106 are depicted and described throughout the disclosure. However, one of ordinary skill in the art will appreciate that any appropriate light-emitting source may be used (e.g., infrared laser). Additionally, while one or more LEDs are depicted through the disclosure, one of ordinary skill in the art will appreciate that the eye tracking functionality may operate without LEDs.

The docking device 104 may include any number of infrared LEDs 106 that may be placed in a suitable location in any manner within the docking device 104 (e.g., tilted at an angle such that it points toward the user's face). In a specific embodiment, the one or more LEDs 106 may be synchronized with the one or more cameras in such a way that the one or more LEDs 106 are on when the one or more cameras are grabbing a frame, and off otherwise.

In some embodiments, the docking device 104 may also include any suitable type of infrared pass filter (e.g., active, mechanical, high-pass, band-pass, etc.). In some embodiments, a high-pass filter that blocks light below 800 nm and allows light above 800 nm is used. In some embodiments, the infrared band pass filter may only allow light between 800-900 nm to enter the one or more cameras of the camera module 108.

The camera module 108 may include one or more front-facing cameras placed in any suitable location in any manner within the docking device 104 (e.g., tilted at an angle such that they point toward the user's face) and may be used to capture images of the user's eyes and/or face. The one or more cameras may be placed at an appropriate distance from the LEDs 106 to optimize the proper capture of the infrared light. In some embodiments, a camera on the computing device 102 is used in combination with camera module 108 in stereo mode. In some embodiments, the camera module 108 may include any one or more of the following: a black and white (e.g., monochrome) or color (e.g., RGB) complementary metal-oxide-semiconductor (CMOS) sensor running at a suitable frame-per-second rate (e.g., high-definition at 30 frames per second), a lens without an infrared block filter and with an appropriate field of view (e.g., approximately 35 degrees) and depth of field (e.g., approximately 30-80 cm for a mobile device, approximately 2-5 meters for a television, etc.), and the like. The one or more cameras in the camera module 108 may be positioned such that the one or more cameras are tilted toward a user's face.

The images captured by the camera may be rotated. The eye tracking software can use sensors on the computing device 102 (e.g., accelerometer, magnetometer, etc.) to detect the orientation of the computing device 102 and rotate the image accordingly so that it can be properly processed.

The LEDs 106 emit light that may be focused and centered toward the eyes of the user. The infrared light from the LEDs 106 is reflected in the pupil and on the cornea of the user and recorded by the cameras in the camera module 108. In some embodiments, the LEDs 106 may be synchronized with the one or more cameras so that the LEDs 106 are on only when the one or more cameras are grabbing an image. In some embodiments, to improve the image quality, the visible light below 800 nm is filtered out using an infrared pass filter. The field of view and depth of view of the lenses of the one or more cameras in the camera module 108 may allow the user to move around, thereby accommodating for head pose variance of the user. The eye tracking control software may analyze the images taken by the camera module 108 to provide x,y coordinates of where the user is looking on the display of the computing device 102. The x,y coordinates may be used for any number of applications (e.g., scrolling, moving objects, selecting icons, playing games, etc.).

The LEDs 106 and the camera module 108 may be turned on and/or off in any manner, such as by utilizing an external slider, an on-off dedicated button on the side or on the back of either the computing device 102 or the docking device 104, controlled by an application or a digital button on the screen, controlled by movement or shaking of the computing device 102 and/or the docking device 104, controlled by voice commands, on-screen capacitive buttons, touch pad(s), bio-signals (e.g., EMG, EEG, etc.), remote wireless control, and the like. As such, in some embodiments, the eye tracking components may consume power only while the LEDs 106 and the camera are turned on (e.g., when the user is using the eye tracking features).

In some embodiments, the eye tracking features may be optimized when the camera is located at the bottom of the computing device 102 (e.g., with respect to the perspective of the user). The user may rotate the computing device 102 coupled to the docking device 104 to properly orient the camera module 108 such that it is located at the bottom of the computing device 102. In some embodiments, using the accelerometer and/or magnetometer of the computing device 102, the LEDs 106, the pass filter, and/or the camera may be turned on and/or off depending on the orientation of the computing device 102 and the docking device 104 (e.g., turn off the LEDs 106 and the camera when the computing device 102 and the docking device 104 are rotated such that the camera module 108 is located at the top of the computing device 102 with respect to the perspective of the user).

The LEDs 106 and the camera may be turned off when the user's face is not recognized for a predetermined amount of time (e.g., 5-10 seconds) and may turn on again when the user's face is detected and recognized.

Figure 2:
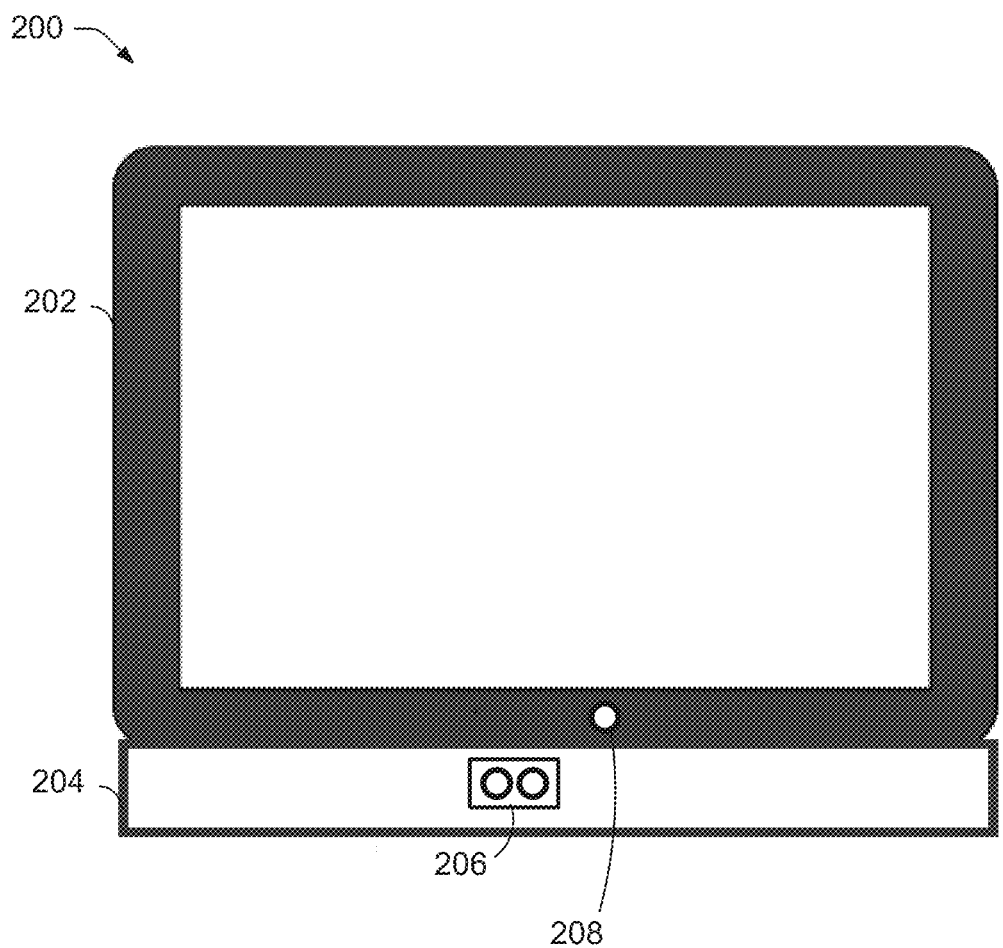
FIG. 2 is a device diagram of another example of a computing device coupled to a docking device capable of facilitating eye tracking control, according to some embodiments.

FIG. 2 is a device diagram 200 of another example of a computing device 202 coupled to a docking device 204 capable of facilitating eye tracking control. The example shown in FIG. 2 may operate similarly to the example shown in FIG. 1 and may incorporate any one or combination of features described for FIG. 1. However, FIG. 2 shows that the docking device 204 may be integrated with LEDs 206, and the camera module 208 of the computing device 202 may be used (instead of the camera module 208 being integrated with the docking device 204). In some embodiments which couple the computing device 202 with the docking device 204 using a USB, a micro-USB port, or a proprietary port, the configuration depicted in FIG. 2 may allow for faster transfer of images from the camera since the camera of the computing device 202 is used to capture the images. The front-facing camera for eye tracking control may be utilized while simultaneously utilizing one or more back-facing cameras.

Figure 3A:
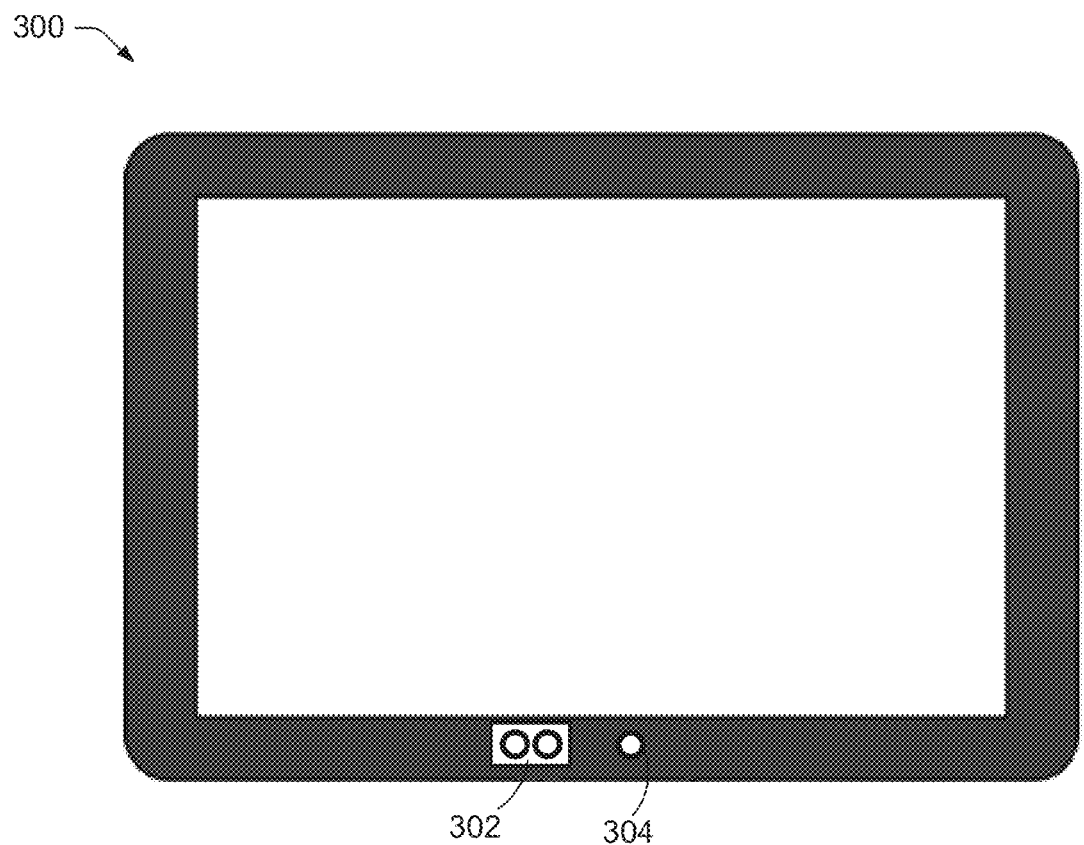
FIGS. 3A-3C are device diagrams of example computing devices capable of facilitating eye tracking control, according to some embodiments.
Figure 3B:
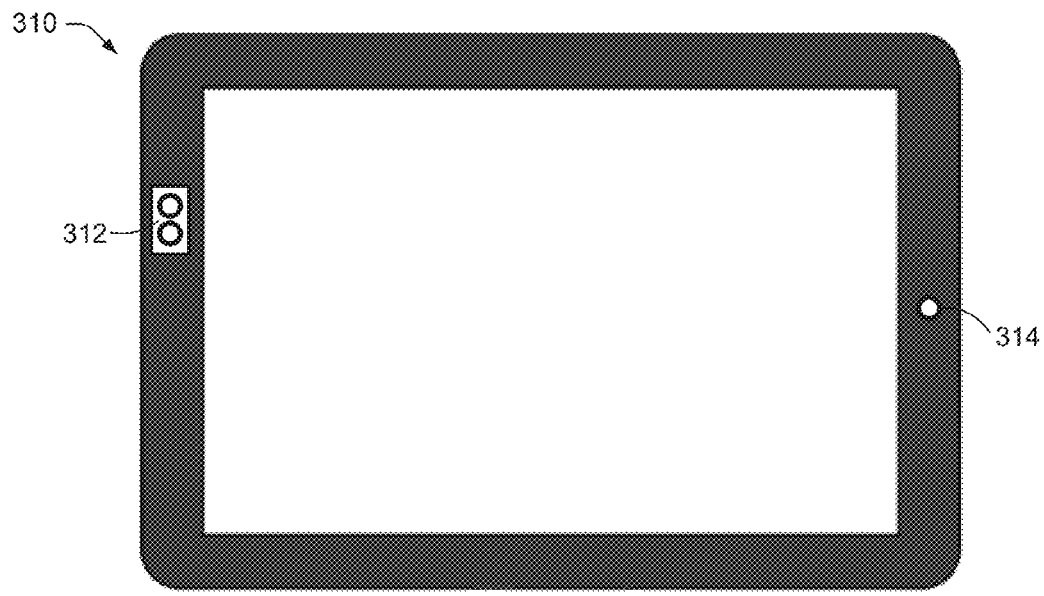
Figure 3C:

FIGS. 3A-3C are device diagrams of example computing devices capable of facilitating eye tracking control. The examples shown in FIG. 3A-3C may operate similarly to the example shown in FIG. 1 and may incorporate any one or combination of features described for FIG. 1. However, the LEDs and camera modules are integrated into the computing device (instead of being part of a docking device 204). FIGS. 3A-3C depict computing devices 300, 310, 320, respectively, with LEDs 302, 312, 322 and camera modules 304, 314, 324 integrated into the computing devices 300, 310, and 320 in different example configurations (with respect to the user's perspective).

The LEDs 302, 312, 322 and the camera modules 304, 314, 324 on the computing devices 300, 310, 320 may be located in any one of a number of configurations on the computing devices. FIG. 3A shows the LEDs 302 and the camera module 304 being located at the bottom of the computing device 300. FIG. 3B shows the LEDs 312 being located on one side of the computing device 310 while the camera module 314 is located on the opposite side of the computing device 310. FIG. 3C shows the LEDs 322 and the camera module 324 being located on the same side of the computing device 320.

Figure 4A:
FIGS. 4A-4B are device diagrams of example computing devices capable of facilitating eye tracking control, according to some embodiments.
Figure 4B:
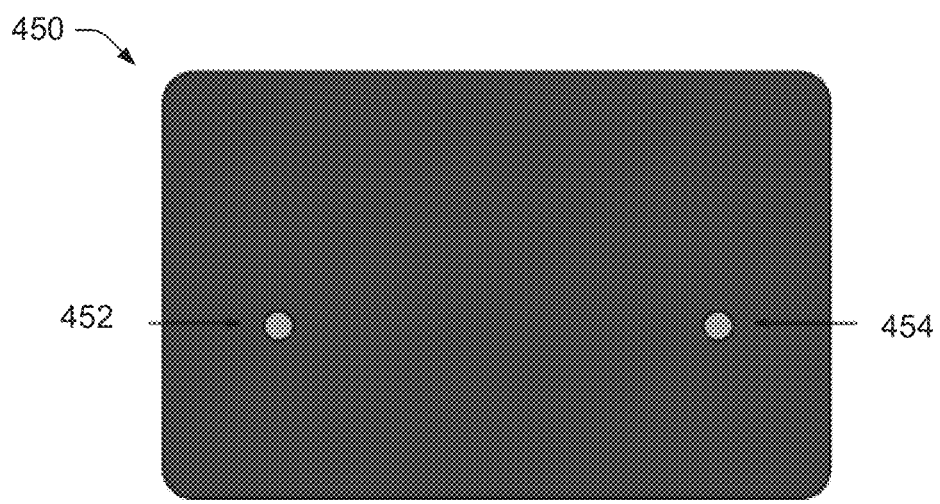

FIGS. 4A-4B are device diagrams of example computing devices capable of facilitating eye tracking control. In FIG. 4A, the computing device 400 may include a left input portion 402 and/or a right input portion 404, which may each be any type of device that may be capable of receiving an input from a user (e.g., a touch sensor, physical buttons, a mouse, a keyboard, biometric signals, etc.). The left input portion 402 and/or the right input portion 404 may be provided on the front of the computing device 400 (e.g., on the display side of the computing device 400). The user may use the left input portion 402 and/or the right input portion 404 to submit a user input, which may be used to activate eye tracking features, such as the manipulation of a display object at which the user is looking when the input is submitted. FIG. 4B depicts a computing device 450 which may also include a left input portion 452 and/or a right input portion 454. However, the left input portion 452 and/or the right input portion 454 may be provided on the back of the computing device 450 (e.g., on the side opposite the display side of the computing device 450).

In some embodiments, the left input portion 452 and the right input portion 454 may both be enabled to function as a left click and a right click, respectively. In some embodiments, the left input portion 452 and the right input portion 454 may also be enabled as a twin click, giving each gaze selection at least three functions.

Figure 5:
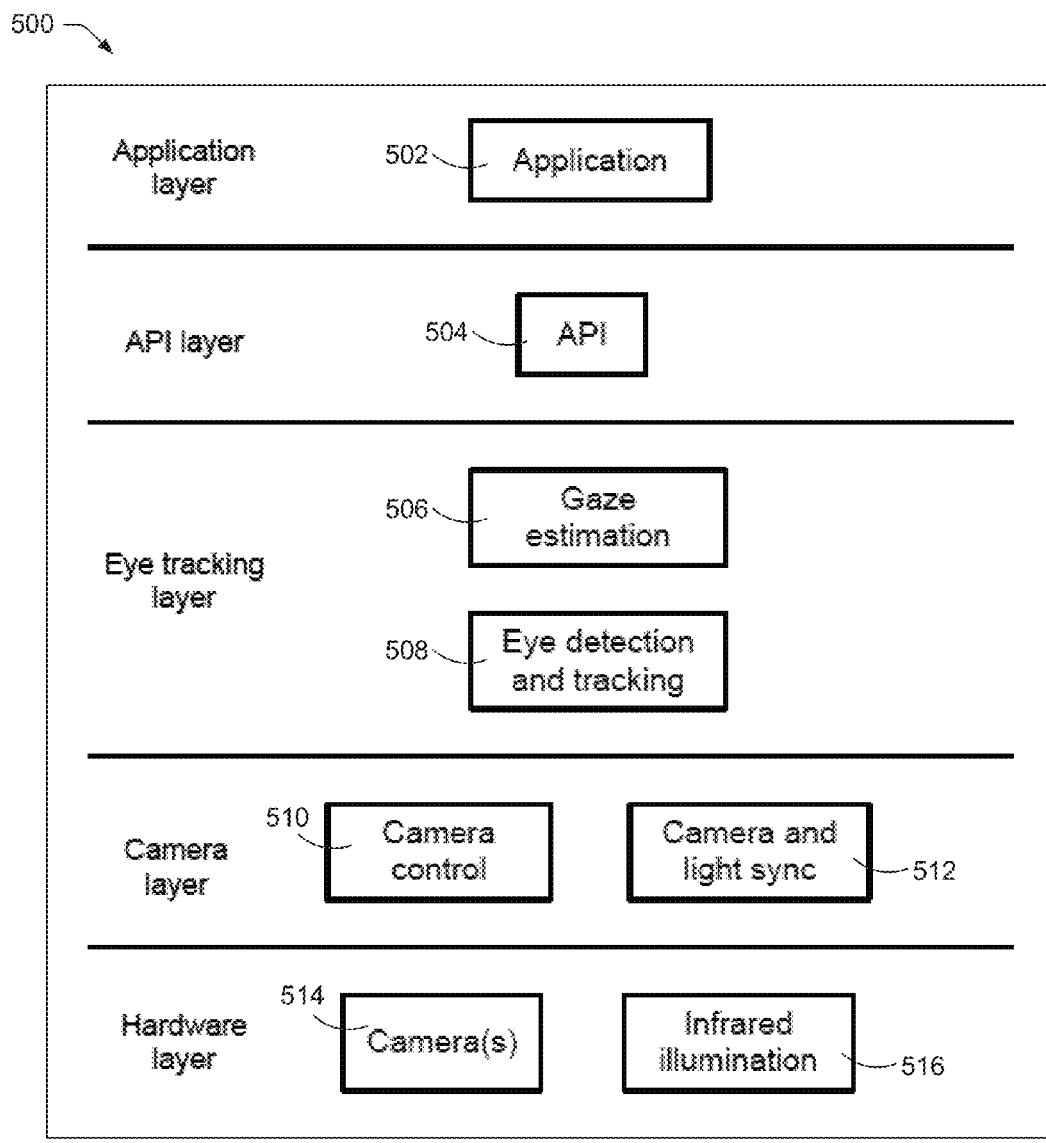
FIG. 5 is a block diagram of an example software architecture for facilitating eye tracking control, according to some embodiments.

FIG. 5 is a block diagram of an example software architecture 500 for facilitating eye tracking control. Any one or more of the components of the software architecture 500 may run on either a central processing unit (CPU) of the computing device 450 or on a combination of a CPU and a graphics processing unit (GPU) of the computing device 450. In some embodiments, any one or more of the components of the software architecture 500 may run on a dedicated chip. The software may run as a background process (e.g. as part of the operating system (OS), in a web browser, etc.) and may provide an application programming interface (API) that other applications can access. The API may fire an event or use some other similar mechanism to send the information of where the user is looking on the screen to other applications.

The software architecture 500 may be divided into different software layers. The bottom layer may include a camera module 514 and an infrared illumination module 516 that may correspond to the respective hardware (e.g. the camera(s), the infrared illumination, etc.). A camera layer may include a camera control module 510 that may be in charge of communicating with the camera(s) in order to perform camera operations such as, for example, starting the camera, grabbing images, controlling the camera properties, and the like. This layer may also include a camera and light sync module 512 that may synchronize the one or more cameras and the infrared emitters so that the lights are turned on by the eye tracking software in order to improve tracking of the user's eyes and minimize energy consumption.

The camera layer may deliver images to the eye tracking layer or eye tracking engine. In the eye tracking layer, a gaze estimation module 506 may process images to find features like face location, eye region location, pupil center, pupil size, location of the corneal reflections, eye corners, iris center, iris size, and the like. These features may be used by the eye detection and tracking module 508 in the gaze estimation stage, which may be in charge of calculating the point of regard of the user, which may be the location on the display where the user is looking. The gaze estimation module 506 may also calculate the optical and visual axes of the user's eyes and calibrate the calculation based on specific features of the user.

The API layer may be used for communication between the eye tracking layer and applications that use eye gaze information (e.g., OS API, games that employ eye gaze information, etc.). The API module 504 may send data calculated by the eye tracking layer, such as coordinates of the point of regard, three-dimensional (3-D) location of the user's eyes, pupil size, distance between the eyes, head orientation, head movement, and the like. The API module 504 may also accept commands from an application to the eye tracking layer (e.g., to start and/or stop the eye tracking engine, query for specific information, etc.). An application module 502 may connect to the eye tracker's API module 504 and use eye gaze information for any suitable purpose (e.g., control an app or a game, record eye data for visual behavior studies, etc.).

Figure 6:
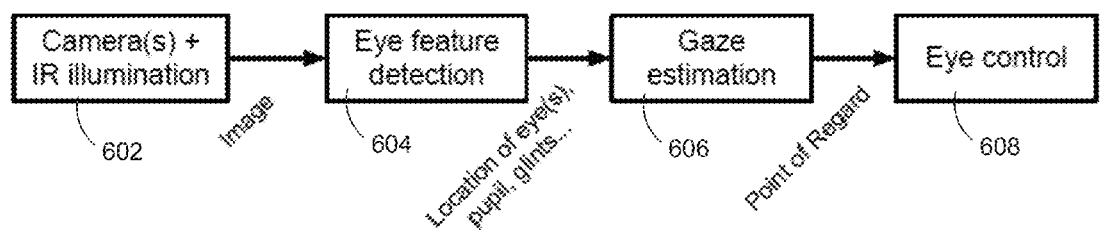
FIG. 6 is a block diagram of an example flow of data used to facilitate eye tracking control, according to some embodiments.

FIG. 6 is a block diagram of an example flow of data used to facilitate eye tracking control. The one or more cameras and the infrared LED illumination modules 602 may capture an image of the user. The eye feature detection module 604 may use the captured data to detect eye features (e.g., location of eye(s), pupils, corneal reflections, etc.). Using the detected eye features, the gaze estimation module 606 may estimate the user's point of regard, which may then be used to control aspects of an application through the eye control module 608.

A calibration process may be conducted when the user initially uses the eye tracking functionality in order to calculate personal parameters specific to the user (e.g., vertical and horizontal offset between optical and visual axes). These personal parameters and the information of the face and eyes are then employed to estimate where the user is looking on the screen through a gaze estimation algorithm. Any suitable calibration process may be used to calculate the personal parameters specific to the user. In some embodiments, the eye tracking system may be calibrated (or recalibrated) by matching a path followed by a moving target displayed on a display of the computing device 400 with a path described by any information such as the pupil, the iris, the point of regard, the optical axis, the visual axis, the one or more corneal reflections produced by the one or more infrared light sources, or a combination of these.

Figure 7A:
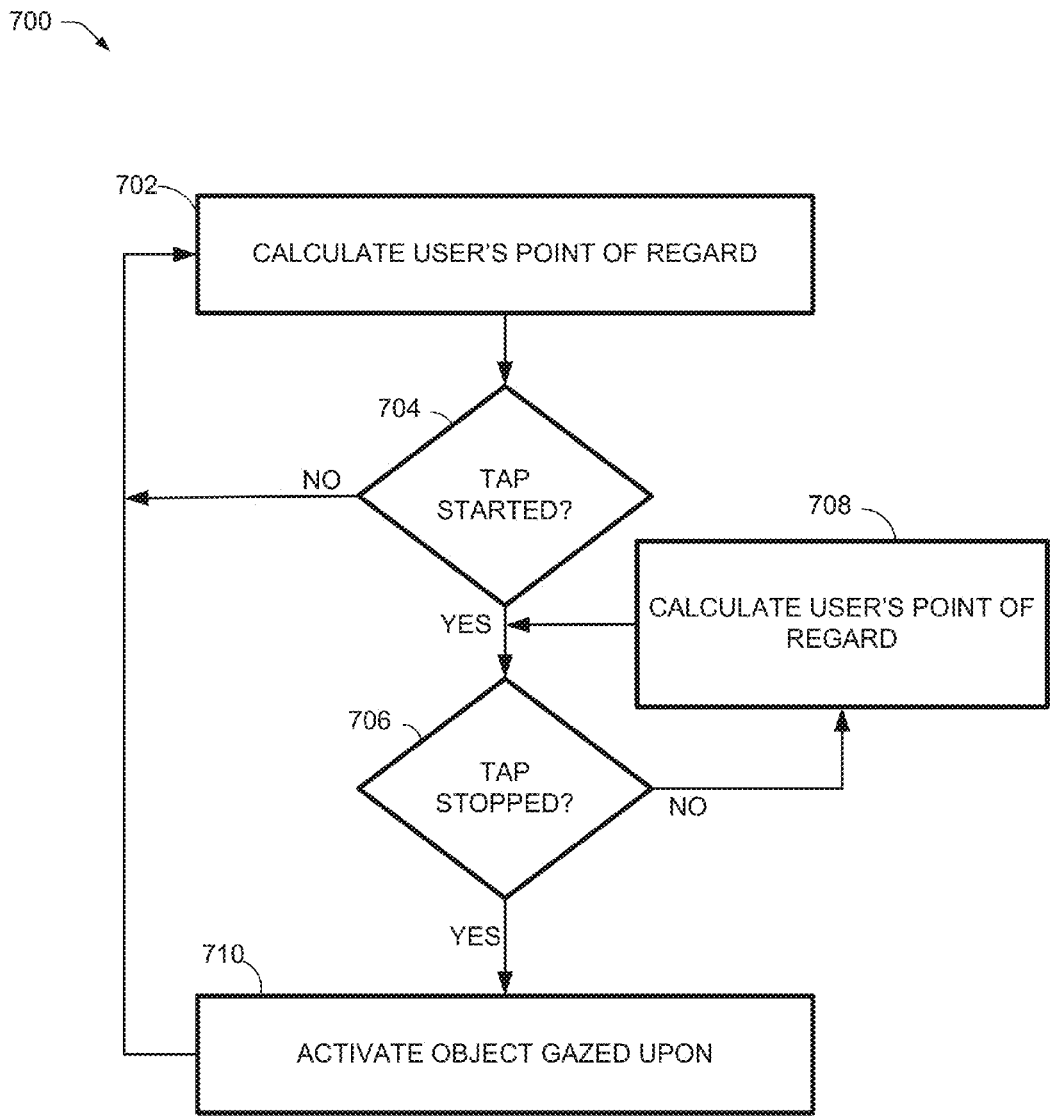
FIGS. 7A-7B are flowcharts of example methods of facilitating eye tracking control, according to some embodiments.
Figure 7B:
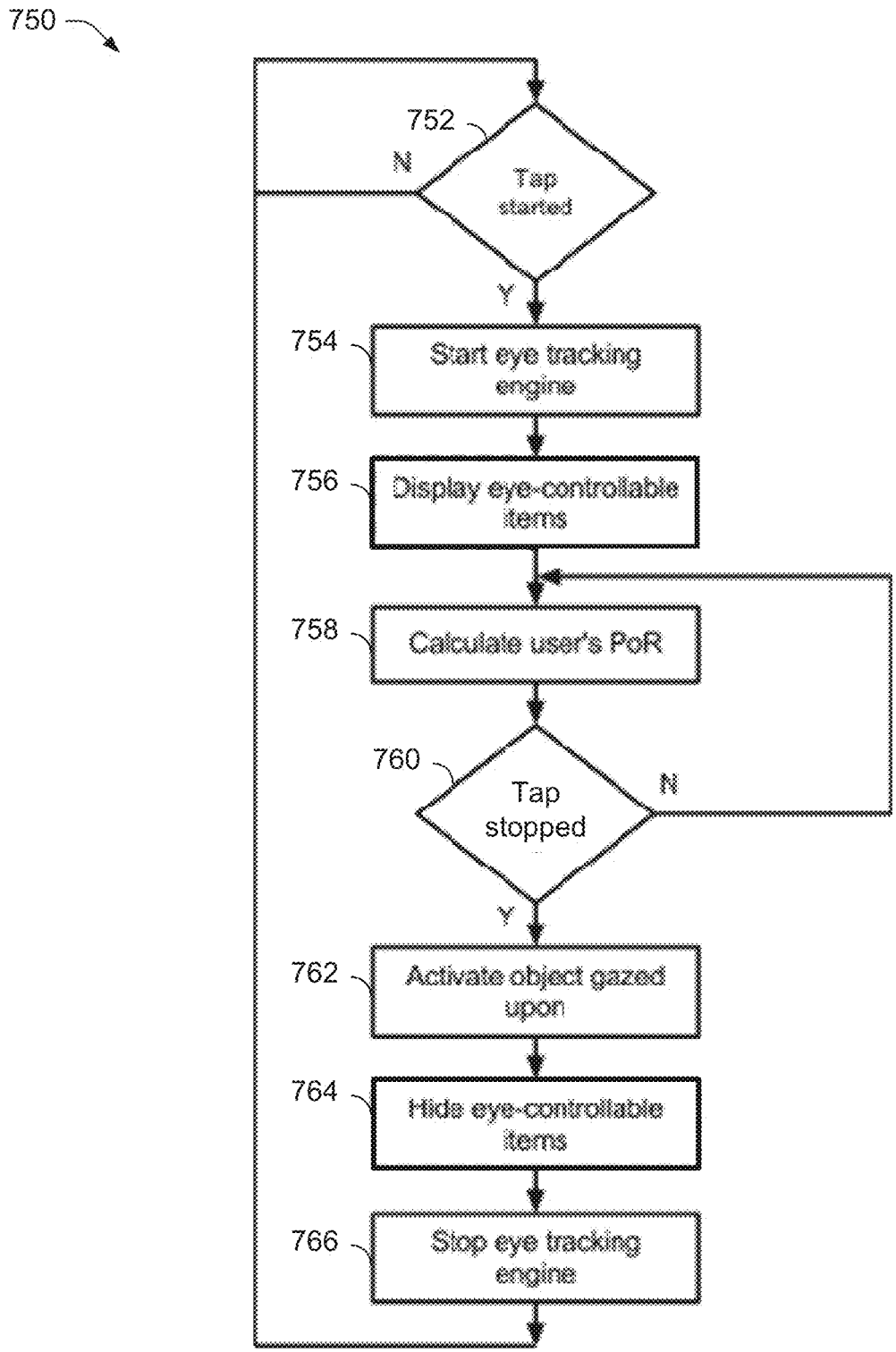

FIGS. 7A-7B are flowcharts of example methods of facilitating eye tracking control. FIG. 7A depicts a method 700 in which the user's point of regard may be used in combination with a user input from the user to manipulate a display object associated with the user's point of regard.

In operation 702, the user's point of regard may be calculated. In operation 704, the computing device may determine whether the user has submitted a user input indicating the desire to activate functionality associated with controlling a particular display object using the user's gaze (e.g., a tap of the input button). If no input from the user has been received, the computing device may continue calculating the user's point of regard (operation 702) at any appropriate predetermined rate until an appropriate input is submitted by the user.

In operation 706, when the user submits a user input indicating the desire to activate functionality associated with controlling a particular display object using the user's gaze, the computing device may determine whether the input is still being submitted. For example, the user may be pressing and holding an input button. In operation 708, if the input is still being received from the user (e.g., the user is still holding down the input button), the computing device may continue to calculate the user's point of regard at any appropriate predetermined rate until the user has stopped submitting the user input (e.g., the user has released the input button).

In operation 710, once the user has stopped submitting a user input, the computing device may determine the last point of regard or the location of the last fixation calculated for the user (e.g., the point of regard or location of fixation at the time the input is no longer received), determine a display object associated with the point of regard calculated, and activate the display object. Activating the display object may include providing the user with the capability to manipulate the display object in any manner. For example, this may include opening an application associated with an icon at which the user is looking, highlighting a particular display object at which the user is looking, displaying a menu of options associated with the display object at which the user is looking, and the like.

FIG. 7B depicts a method 750 in which the user's point of regard may be used in combination with a user input from the user to manipulate a display object associated with the user's point of regard. In the method 750, the eye tracking engine may begin tracking the user's gaze when activation occurs through the user input. In some embodiments, this may help manage power consumption by turning the camera module and LEDs on only when the user input is submitted by the user.

In operation 752, the computing device determines whether a user input (e.g., a tap on a touch screen) has been received from the user. If no user input has been received, the computing device may continue to monitor whether a user input is received.

In operation 754, when the user input is received at the computing device, the eye tracking engine may begin tracking the user's gaze.

In operation 756, the computing device may display eye-controllable items in response to the user input, which may be any items or objects that may be controlled by the user's gaze, such as a menu, selectable buttons, and the like. However, the method 750 may operate with or without operation 756.

In operation 758, the user's point of regard information may be calculated. The user's point of regard information may be calculated in any suitable manner.

In operation 760, the computing device determines whether receipt of the user input has stopped (e.g., the user has released the tap of the activation button). If the user input has not stopped, the computing device may continue to calculate the user's point of regard at any appropriate rate.

In operation 762, once the user has stopped submitting the user input (e.g., the user releases the activation button), the computing device may determine the last point of regard or the location of the last fixation calculated for the user (e.g., the point of regard or location of fixation at the time the input is no longer received), determine a display object associated with the point of regard calculated, and activate the display object upon which the user last gazed, if any. For example, if the user last looked at a menu item displayed when the activation button was pressed (e.g., operation 756), the operation associated with the menu item may be activated.

In operation 764, the eye-controllable items may be hidden or no longer displayed on the computing device. However, the method 750 may operate with or without operation 764.

In operation 766, the eye tracking engine terminates tracking of the user's gaze and waits until another user input is received (e.g., operation 752).

In some embodiments, double tapping or holding the user input button may provide extra functionality. For example, a double tap and hold, or a press and hold, of the user input button may activate a discrete zoom that magnifies the area at which the user is looking, activates an automatic scroll function on a browser, or automatically pans for a map application. When the user releases the user input button, the object gazed upon when the user released the user input button may be selected.

In some embodiments, the user may wish to have the eye tracking engine running continuously in the background without having to hold down the user input button. This may be accomplished by performing operations, such as double clicking, holding the button down for a predetermined amount of time (e.g., 5 seconds), by a voice command, by a setting on the eye tracking software settings, and the like. Double clicking or holding the button down for a predetermined amount of time may also turn the eye tracking features off if they were previously turned on. Leaving the eye tracking engine running continuously in the background may be useful if the user is performing particular tasks on the computing device, such as writing or drawing with the eyes, scrolling on a page, and the like.

FIGS. 8A-8J are interface diagrams depicting example user interfaces displaying objects to facilitate eye tracking control. While specific examples are shown in FIGS. 8A-8F, the technology is not limited by these examples, and any configuration or combination of configurations may be implemented. In some embodiments, settings associated with links, shortcuts, and the like, may be configured by a user in a settings menu associated with the eye tracking features.

Figure 8A:
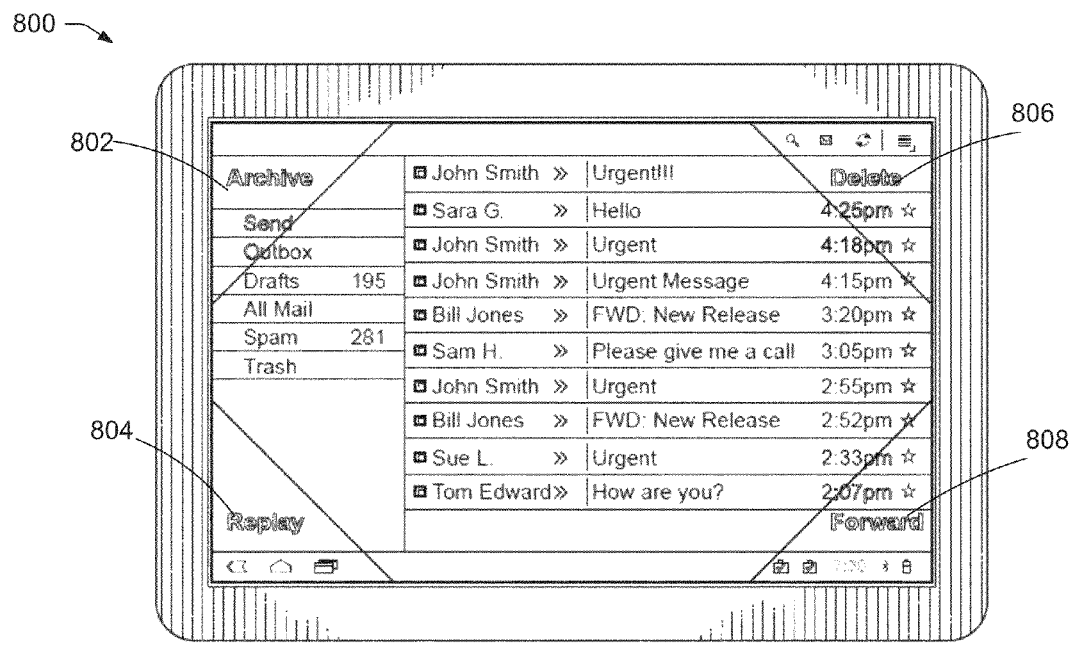
FIGS. 8A-8J are interface diagrams depicting example user interfaces displaying objects to facilitate eye tracking control, according to some embodiments.

FIG. 8A depicts an example user interface 800 displaying overlay objects in a mail program setting, including an archive object 802, a reply object 804, a delete object 806, and a forward object 808. When the user input button is activated (e.g., pressed and held), the overlay objects may appear, and the user may look at one of the overlay objects (e.g., archive object 802) and release the user input button to select the function assigned to the overlay object upon which the user gazed (e.g., email will be archived). While the example of FIG. 8A depicts overlay objects associated with an email application, the overlay objects may include any objects associated with relevant functions (e.g., shortcuts associated with an application, a back and/or forward button in a browser to move through the browser history, commands to move or attack or defend in a game, etc.).

Figure 8B:
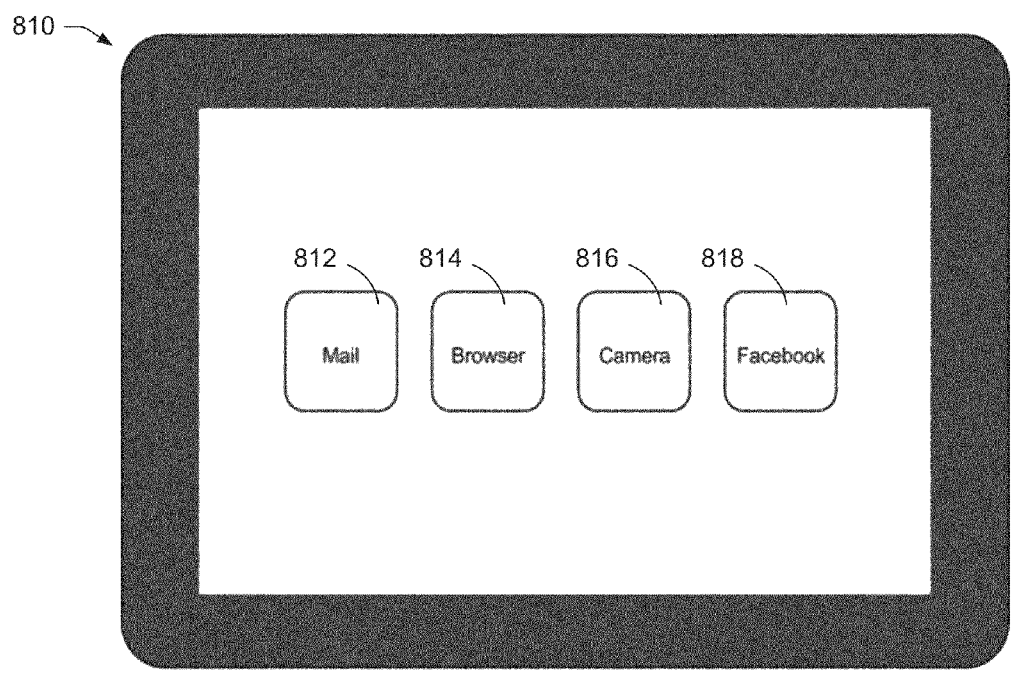

FIG. 8B depicts an example user interface 810 displaying a menu associated with shortcuts, including a mail shortcut 812, a browser shortcut 814, a camera shortcut 816, and a social media application shortcut 818. When the user input button is pressed and held, the menu shown in FIG. 8B may appear. The point of regard of the user may be calculated, and if the point of regard is associated with a location that is within one of the shortcuts shown in the user interface 810 when the user input button is released, the action associated with that shortcut is performed.

Figure 8C:
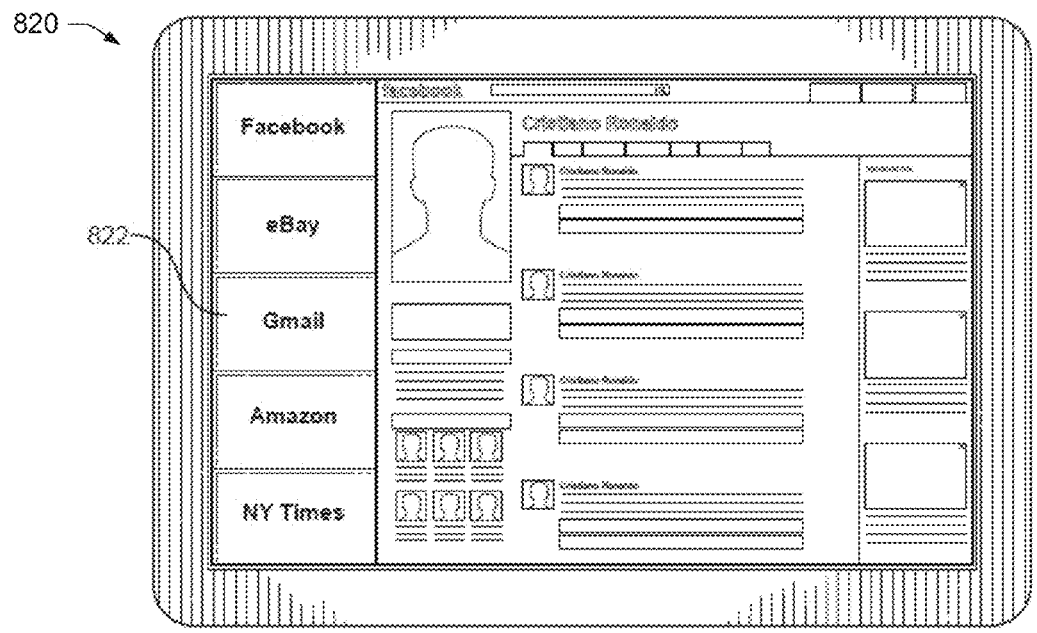

FIG. 8C depicts an example user interface 820 displaying a menu 822 associated with shortcuts. When the user input button is pressed and held, the menu 822 may appear. Activating a user input button on the right side may trigger the appearance of the shortcuts on the left side, and vice versa with different shortcuts on the right side. The point of regard of the user may be calculated, and if the point of regard is associated with a location that is within one of the shortcuts shown in the user interface 820 when the user input button is released, the action associated with that shortcut is performed.

Figure 8D:
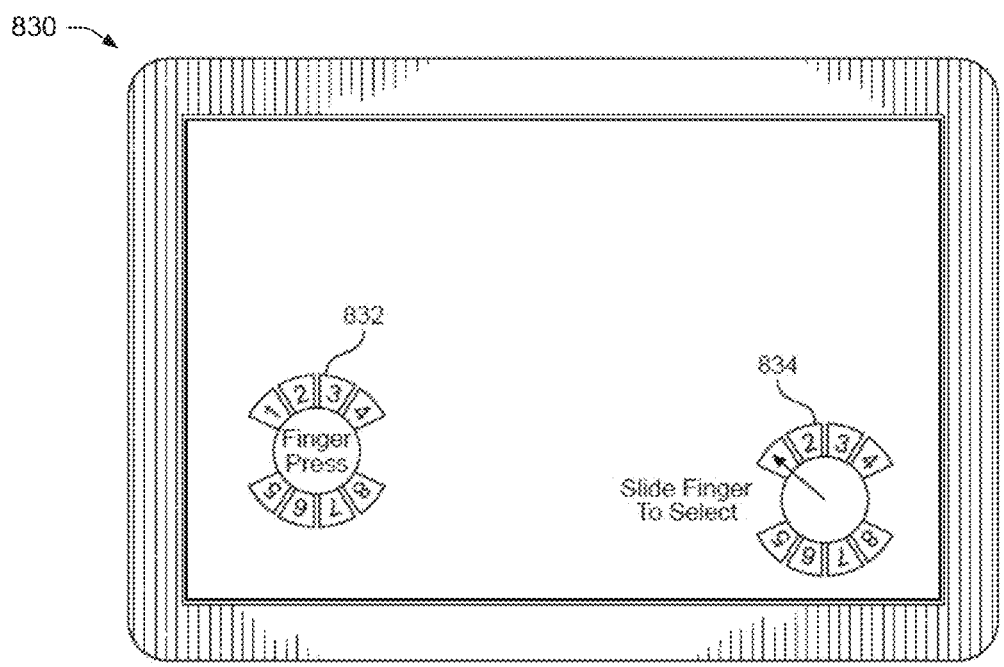

FIG. 8D depicts an example user interface 830 displaying multi-function buttons 832 and 834. When the user input button is pressed and held, one or both of the multi-function buttons 832 and 834 may appear. In some embodiments, one or both of the multi-function buttons 832 and 834 may appear when the user touches and holds the display of the computing device at any location on the display. Each of the sub-buttons 1-8 in the multi-function buttons 832 and 834 may then be activated by sliding the finger to the area of the sub-button and holding and releasing. In some embodiments, the multi-function buttons 832 and 834 may be activated at the same time and may have different functions assigned to the sub-buttons on each side. In some embodiments, activating one or more of the multi-function buttons 832 and 834 may generate a specific command on the object being gazed upon by the user.

Figure 8E:
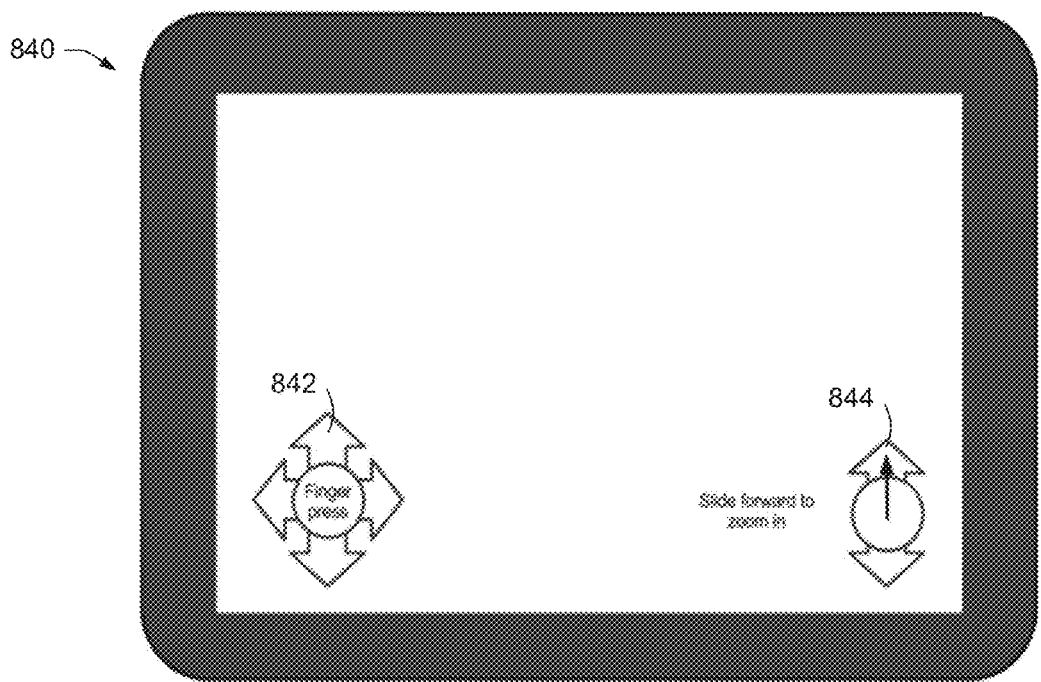
Figure 8F:

FIG. 8E depicts an example user interface 840 displaying a slider button 844 when the user submits a touch input at any location on the display of the computing device, such as at location 842. For example, when the user presses their finger on location 842, the slider button 844 may appear. In some embodiments, the slider button 844 may appear as a semi-transparent layer on top of the application being displayed on the computing device. In some embodiments, the slider button 844 may include icons that indicate different options available through the slider button 844. The user may slide the finger in any indicated direction on the slider button 844 to perform any associated function, such as zooming in or out of the application at the location of the user's point of regard, turning the volume up or down on the computing device, scrolling, panning, tilting a view on a specific target, and the like. FIG. 8F depicts another example user interface 850 displaying another slider button 852, which may function similarly to the slider button 844 of FIG. 8E.

Figure 8H:
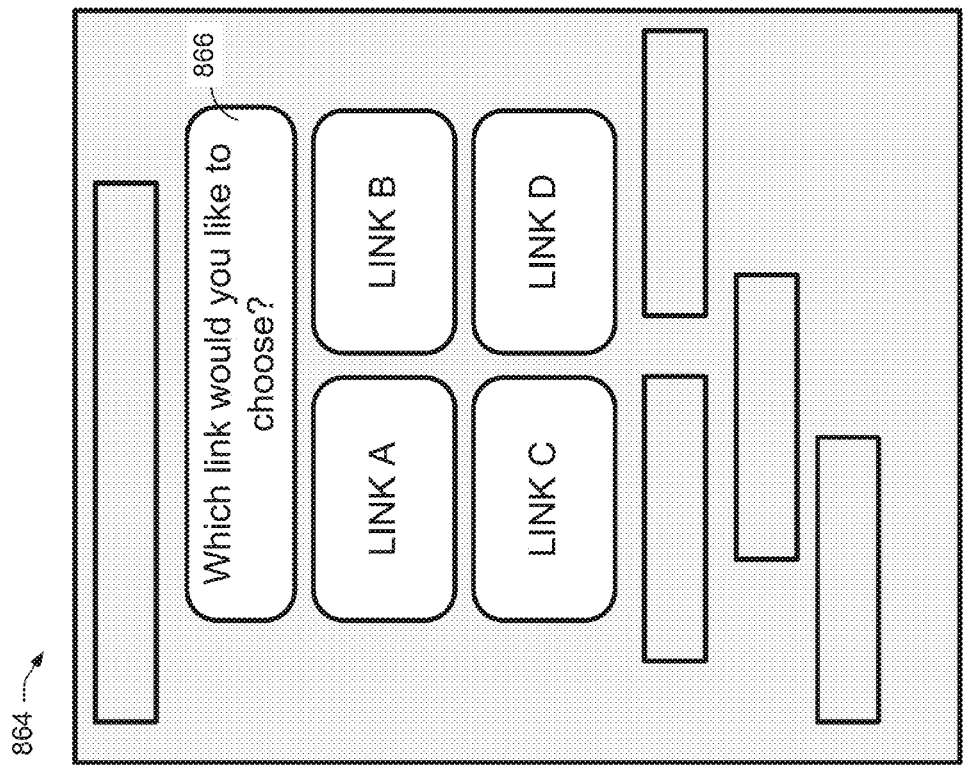
Figure 8G:
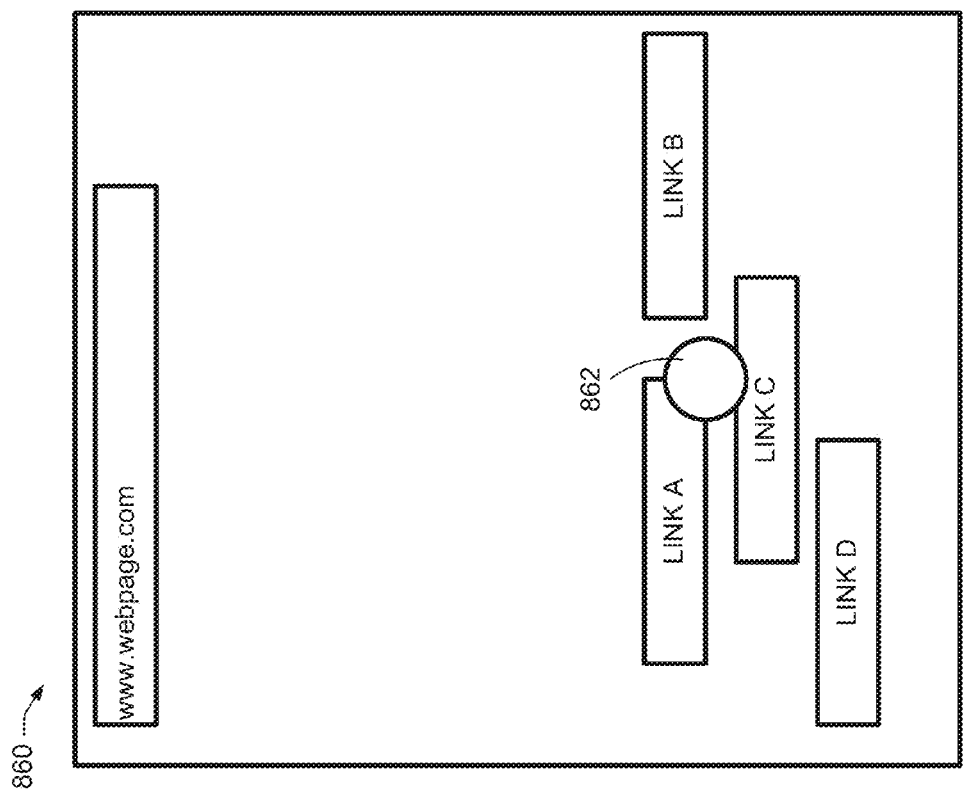

FIGS. 8G-8H depict example user interfaces 860 and 864 displaying a website page with links A, B, C, and D and a point of regard 862 of the user. The website page may scroll automatically based on a point of regard being at or near either the top or the bottom of a page. Additionally, when a user views the website page at a particular point of regard that is close to a link (e.g., within a range of 2-3 cm from the point of regard), the link may be highlighted, and the user may press or touch and release the input button to select the link that is highlighted, and the link will be opened.

In some embodiments, if there is more than one link near the point of regard, each link may be highlighted, and upon pressing the input button, an overlay may appear with the relevant targeted links shown in an enlarged manner so that selecting the link may be easier for the user.

In some embodiments, the highlighted link or links may also appear when pressing and holding the input button, which may result in the display of an overlay of the link or links. When the user releases the input button, the link at which the user was looking upon release may be selected and opened.

In some embodiments, the links near the point of regard may automatically be highlighted and displayed in an overlay. The eye tracking software may be able to intelligently determine with which links the user may want to interact. If the user looks outside of the overlay area while holding the input button, the eye tracking software may determine that the user would like to select other links near the user's point of regard that is outside of the overlay area and may display those links in an overlay accordingly. In some embodiments, the links in the overlay may fade in and out so that the user sees a smoother transition between the different links displayed in the overlay.

For example, in the user interface 860 of FIG. 8G, if the point of regard of the user is at the point of regard 862, links A, B, C, and D may be highlighted, and the user may submit an input to indicate that a highlighted link is to be selected. In some embodiments, when the user looks at the point of regard 862, links A, B, C, and D may be highlighted when the user presses and holds the input button by displaying an overlay 866 with the links that can be chosen, as shown in the user interface 864 of FIG. 8H. The user may select the link by releasing the input button while the user is looking at one of the links in the overlay 866.

Figure 8I:
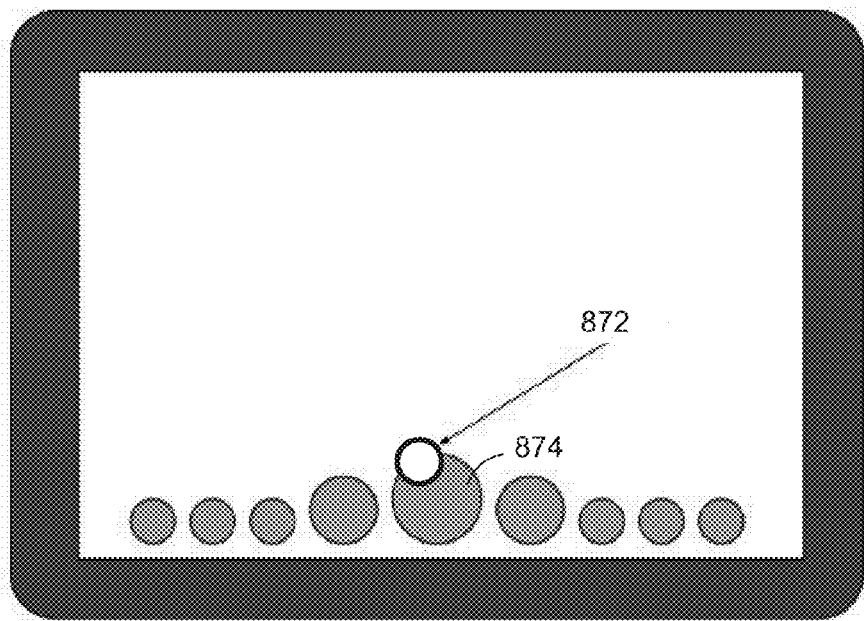
Figure 8J:
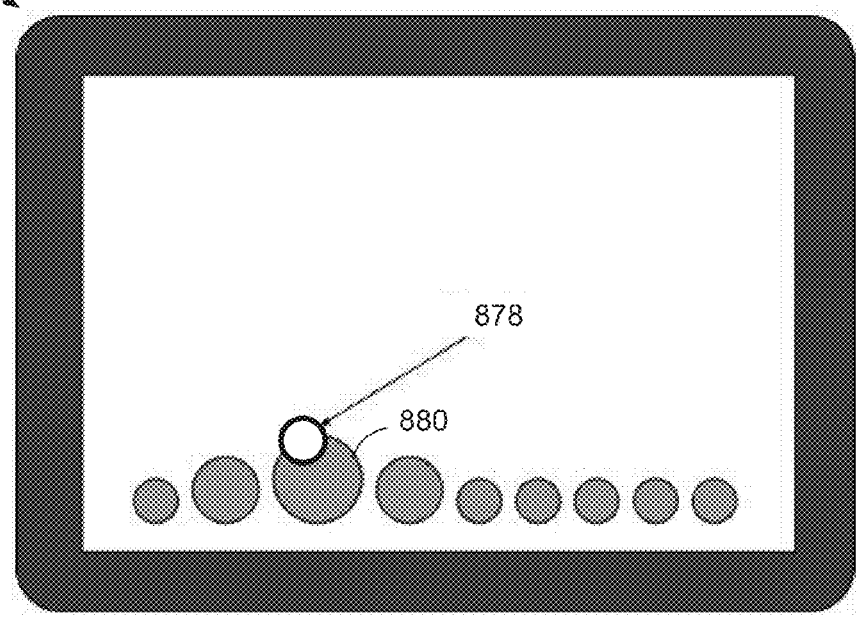

FIGS. 8I-8J depict example user interfaces 870 and 876 displaying a menu bar highlighted based on the point of regard of the user. When a user gazes over a menu bar, the item in the menu bar that is gazed upon may be magnified while the other items in the menu bar may move slightly away from the item gazed upon, making it easier for the user to select the desired item. For example, in FIG. 8I, the user interface 870 may display a menu bar which includes a menu item 874 that is near the point of regard 872 of the user. The menu item 874 is magnified while the other menu items move slightly away from the menu item 874. In some embodiments, the user may press and release the input button while the menu item 874 is highlighted, and the menu item 874 may be selected accordingly. In some embodiments, the magnified menu may be displayed when a user presses the input button, and the menu item gazed upon may be selected upon release of the input button. FIG. 8J similarly depicts a user interface 876 in which a menu item 880 is highlighted by being magnified since the menu item 880 is near the point of regard 878 of the user. In some embodiments, the user may press and release the input button while the menu item 880 is highlighted, and the menu item 880 may be selected accordingly. In some embodiments, the magnified menu may be displayed when a user presses the input button, and the menu item gazed upon may be selected upon release of the input button.

Figure 9:
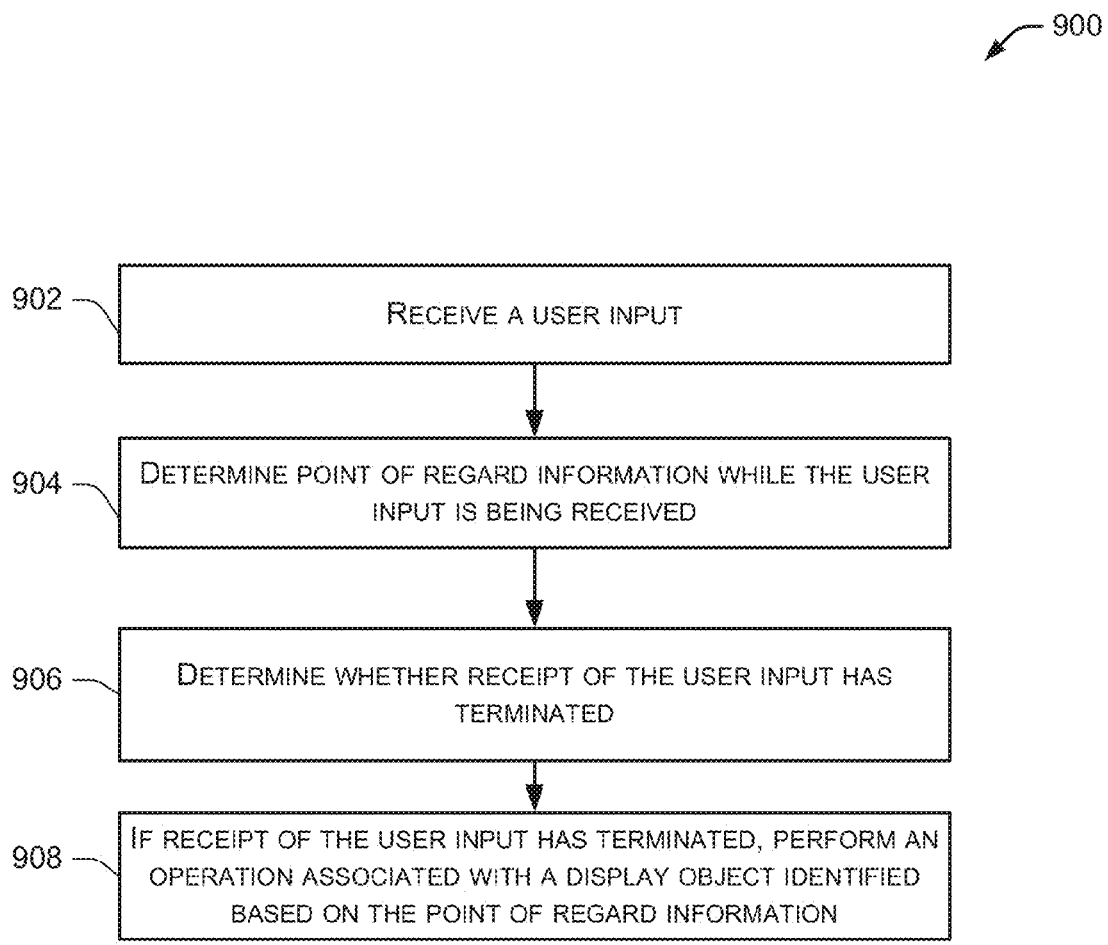
FIG. 9 is a flowchart of an example method of facilitating eye tracking control, according to some embodiments.

FIG. 9 is a flowchart of an example method 900 of facilitating eye tracking control. In operation 902, a hardware-implemented input module receives a user input at a computing device. As described above, the user input may be any type of input, such as a touch sensor input, inputs from physical buttons (e.g., push button), a mouse input, an external trigger, a joystick, a keyboard input, biometric signal input (e.g., electroencephalography (EEG), electromyography (EMG), electrooculography (EOG)), and the like.

In operation 904, a hardware-implemented eye tracking module may determine point of regard information associated with a user of the computing device. This may include determining the point of regard information while the user input is being received (e.g., while the user input button is being pressed and held).

In operation 906, the hardware-implemented input module may determine whether receipt of the user input has terminated (e.g., whether the user input button has been released).

In operation 908, if the receipt of the user input has terminated, the hardware-implemented eye tracking module may perform an operation associated with a display object identified based on the point of regard information. For example, an archive display object may be displayed when the user presses the user input button. If the user releases the user input button while gazing upon the archive display object, an archive operation may be performed in response.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
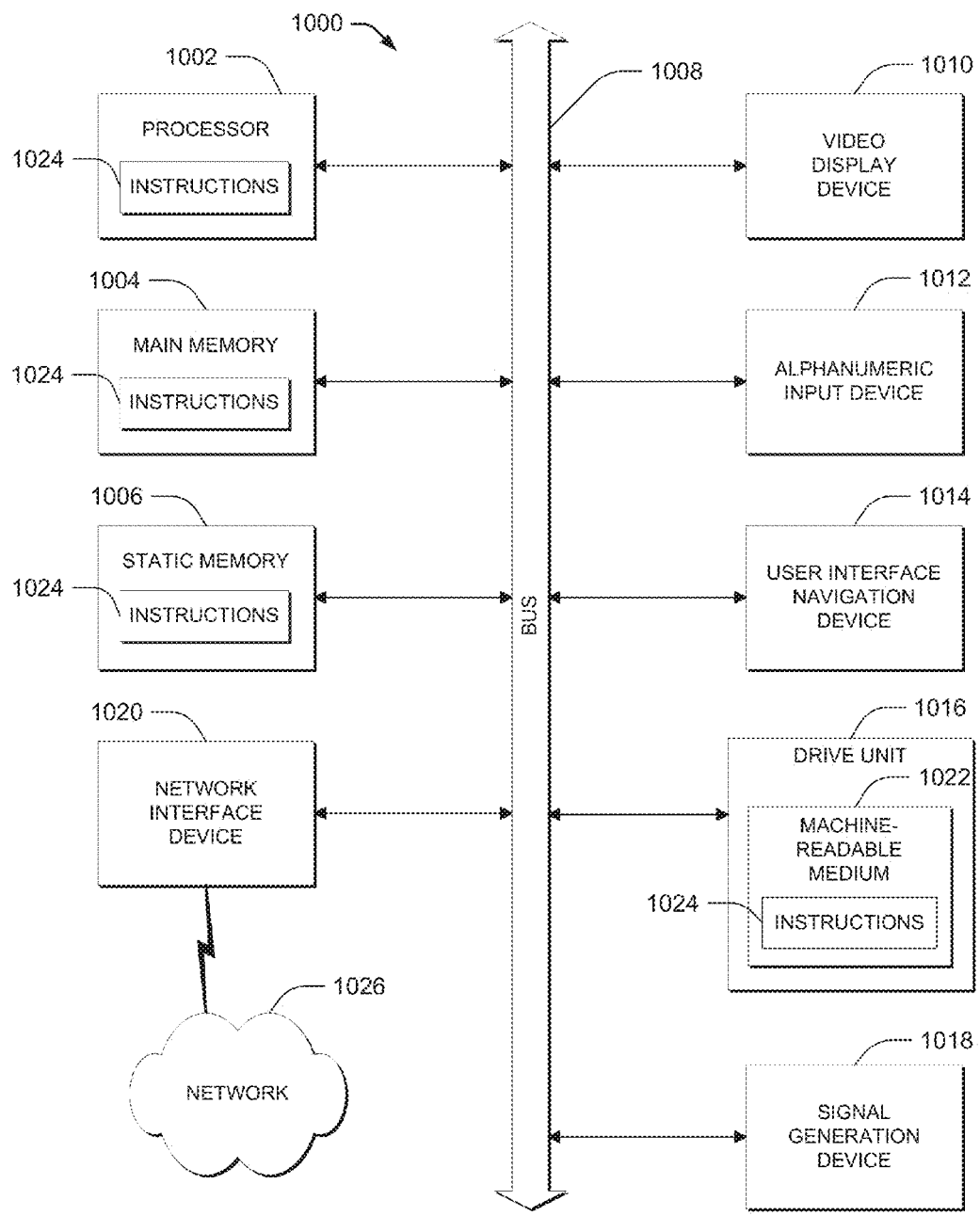
FIG. 10 is a block diagram of a machine in the example form of a computer system within which a set of instructions, for causing the machine to perform any one or more of the methodologies discussed herein, may be executed, according to some embodiments.

FIG. 10 is a block diagram of a machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1000 includes a processor 1002 (e.g., a central processing unit (CPU), a graphics processing unit (GPU) or both), a main memory 1004, and a static memory 1006, which communicate with each other via a bus 1008. Computer system 1000 may further include a video display device 1010 (e.g., a liquid crystal display (LCD) or a cathode ray tube (CRT)). Computer system 1000 also includes an alphanumeric input device 1012 (e.g., a keyboard), a user interface (UI) navigation device 1014 (e.g., a mouse or touch sensitive display), a disk drive unit 1016, a signal generation device 1018 (e.g., a speaker) and a network interface device 1020.

Disk drive unit 1016 includes a machine-readable medium 1022 on which is stored one or more sets of instructions and data structures (e.g., software) 1024 embodying or utilized by any one or more of the methodologies or functions described herein. Instructions 1024 may also reside, completely or at least partially, within main memory 1004, within static memory 1006, and/or within processor 1002 during execution thereof by computer system 1000, main memory 1004 and processor 1002 also constituting machine-readable media.

While machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 1024 may further be transmitted or received over a communications network 1026 using a transmission medium. Instructions 1024 may be transmitted using network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:
receiving a user touch input at a computing device;
while continuing to receive the user touch input:
periodically determining, by a processor and at a plurality of time instances while the user touch input is being continuously received, point of regard information associated with a user of the computing device, the point of regard information comprising a plurality of point of regard measurements obtained during the plurality of time instances and indicating a location on a display of the computing device at which the user is looking during continuous reception of the user touch input; and
activating, in response to the user touch input, an eye control mode at the computing device, the eye control mode providing a plurality of display objects on the display while the user touch input is being received, each display object positioned at a different location within the display and associated with a respective operation capable of being performed based on a point of regard measurement of the plurality of point of regard measurements obtained at a time when the receipt of the user touch input has terminated;
determining whether receipt of the user touch input has terminated; and
performing an operation associated with a display object of the plurality of display objects identified by the point of regard at a moment the user touch input selecting the display object has terminated.

2. The method of claim 1, wherein the user touch input is any one of a touch sensor input, a push button input, a mouse input, a keyboard input, or a biometric signal input.

3. The method of claim 1, wherein the operation associated with the display object includes moving or selecting the display object.

4. The method of claim 1, wherein the operation associated with the display object includes launching an application.

5. The method of claim 1, further comprising:
terminating the eye control mode when the receipt of the user touch input has terminated.

6. A non-transitory machine-readable storage medium storing instructions which, when executed by one or more processors, cause the one or more processors to perform operations comprising:
receiving a user touch input at a computing device;
while continuing to receive the user touch input:
periodically determining, by the one or more processors and at a plurality of time instances while the user touch input is being continuously received, point of regard information associated with a user of the computing device, the point of regard information comprising a plurality of point of regard measurements obtained during the plurality of time instances and indicating a location on a display of the computing device at which the user is looking during continuous reception of the user touch input; and
activating, in response to the user touch input, an eye control mode at the computing device, the eye control mode providing a plurality of display objects on the display while the user touch input is being received, each display object positioned at a different location within the display and associated with a respective operation capable of being performed based on a point of regard measurement of the plurality of point of regard measurements obtained at a time when the receipt of the user touch input has terminated;
determining whether receipt of the user touch input has terminated; and
performing an operation associated with a display object of the plurality of display objects identified by the point of regard at a moment the user touch input selecting the display object has terminated.

7. The non-transitory machine-readable storage medium of claim 6, wherein the user touch input is any one of a touch sensor input, a push button input, a mouse input, a keyboard input, or a biometric signal input.

8. The non-transitory machine-readable storage medium of claim 6, wherein the operation associated with the display object includes moving or selecting the display object.

9. The non-transitory machine-readable storage medium of claim 6, wherein the operation associated with the display object includes launching an application.

10. A computing device, comprising:
a memory having instructions embodied thereon;
one or more processors configured by the instructions to perform operations comprising:
receiving a user touch input at the computing device;
while continuing to receive the user touch input:
periodically determining at a plurality of time instances while the user touch input is being continuously received, point of regard information associated with a user of the computing device, the point of regard information comprising a plurality of point of regard measurements obtained during the plurality of time instances and indicating a location on a display of the computing device at which the user is looking during continuous reception of the user touch input; and
activating, in response to the user touch input, an eye control mode at the computing device, the eye control mode providing a plurality of display objects on the display while the user touch input is being received, each display object positioned at a different location within the display and associated with a respective operation capable of being performed based on a point of regard measurement of the plurality of point of regard measurements obtained at a time when the receipt of the user touch input has terminated;
determining whether receipt of the user touch input has terminated; and
performing an operation associated with a display object of the plurality of display objects identified by the point of regard at a moment the user touch input selecting the display object has terminated.

11. The computing device of claim 10, wherein the user touch input is any one of a touch sensor input, a push button input, a mouse input, a keyboard input, or a biometric signal input.

12. The computing device of claim 10, wherein the operation associated with the display object includes moving or selecting the display object.

13. The computing device of claim 10, wherein the operation associated with the display object includes launching an application.

14. The computing device of claim 10, wherein the operations further comprise terminating the eye control mode when the receipt of the user touch input has terminated.

* * * * *